(12) United States Patent
Champie

(10) Patent No.: US 9,624,415 B2
(45) Date of Patent: *Apr. 18, 2017

(54) HEAT TRANSFER FLUIDS, SYSTEMS, EFFICIENCIES AND METHODS

(71) Applicant: Bluon Energy, LLC, Sacramento, CA (US)

(72) Inventor: Max Champie, Buena Vista, CO (US)

(73) Assignee: Bluon Energy LLC, McClellan, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/130,713

(22) Filed: Apr. 15, 2016

(65) Prior Publication Data

US 2016/0230061 A1 Aug. 11, 2016

Related U.S. Application Data

(63) Continuation-in-part of application No. 14/536,422, filed on Nov. 7, 2014.
(Continued)

(51) Int. Cl.
*C09K 5/04* (2006.01)

(52) U.S. Cl.
CPC .......... *C09K 5/045* (2013.01); *C09K 2205/12* (2013.01); *C09K 2205/122* (2013.01); *C09K 2205/22* (2013.01); *C09K 2205/43* (2013.01)

(58) Field of Classification Search
CPC . C09K 5/045; C09K 2205/22; C09K 2205/43
See application file for complete search history.

(56) References Cited

U.S. PATENT DOCUMENTS 6,508,950 B1 * 1/2003 Lim ...................... C09K 5/045
 252/67
6,511,610 B2 1/2003 Caron et al.
(Continued)

FOREIGN PATENT DOCUMENTS

AU 2007338824 B2 7/2008
CN 1240804 C 2/2006
(Continued)

OTHER PUBLICATIONS

Radermacher, R. et al., "Vapor Compression Heat Pumps with Refrigerant Mixtures", Chapter 3.10.2.2, Binary Mixture Performance Analysis, Jun. 23, 2005, pp. 112-115, CRC Press, Boca Raton, FL.
(Continued)

*Primary Examiner* — John Hardee
(74) *Attorney, Agent, or Firm* — Fish & Tsang LLP

(57) ABSTRACT

Heat transfer compositions, methods, efficiencies, and systems are disclosed. The compositions have four or more heat transfer components/constituents that have been selected such that the compositions provide an operating performance and energy efficiency that are comparable to, or better than, the performance of R22 and currently available R22 replacements. The four or more constituents have sequenced boiling temperatures that work together to extend the phase change, thereby elongating the heat absorption phase and increasing efficiency. In some embodiments the heat transfer constituents include 15-25% by weight R32, 1-5% by weight R125, 50-70% by weight R134a, and 10-20% by weight R227ea. The compositions may also include 0.5-3.5% by weight R236.

6 Claims, 3 Drawing Sheets

Related U.S. Application Data

(60) Provisional application No. 62/072,931, filed on Oct. 30, 2014, provisional application No. 62/009,102, filed on Jun. 6, 2014.

(56) References Cited

U.S. PATENT DOCUMENTS

| | | |
|---|---|---|
| 6,521,141 B1 | 2/2003 | Roberts |
| 6,991,743 B2 | 1/2006 | Poole et al. |
| 2003/0001132 A1 | 1/2003 | Lee et al. |
| 2007/0284078 A1 | 12/2007 | Leck et al. |
| 2007/0290163 A1 | 12/2007 | Poole et al. |
| 2009/0095014 A1 | 4/2009 | Sun et al. |
| 2010/0065773 A1 | 3/2010 | Bivens |
| 2010/0282999 A1* | 11/2010 | Shimomura ............ C09K 5/045 252/67 |
| 2011/0253927 A1 | 10/2011 | Minor et al. |
| 2012/0312048 A1* | 12/2012 | Poole ...................... C09K 5/045 62/304 |
| 2013/0246288 A1 | 9/2013 | Van Honr et al. |
| 2015/0353801 A1 | 12/2015 | Champie |

FOREIGN PATENT DOCUMENTS

| | | |
|---|---|---|
| CN | 101824305 B | 11/2012 |
| EP | 0742274 | 11/1996 |
| ES | 2416726 T3 | 8/2013 |
| RU | 2135541 C1 | 8/1999 |
| WO | 2011/077088 A1 | 6/2011 |
| WO | 2014076475 A2 | 5/2014 |

OTHER PUBLICATIONS

Roberts, N.A. et al., "Energy Saving Refrigerant Blends Comprising R125, R134a, R600 or R600a", Purdue e-Pubs, International Refrigeration and Air Conditioning Conference, Jul. 12-15, 2004.

"RS-50 (R442A) Lubricant Miscibility", http://www.refsols.com/files/RS-50/RS-50_Oil_solubility.pdf, screen capture Jul. 31, 2014.

* cited by examiner

HEAT TRANSFER FLUIDS, SYSTEMS, EFFICIENCIES AND METHODS

This application is a continuation-in-part of U.S. patent application Ser. No. 14/536,422, filed Nov. 7, 2014, which claims the benefit of priority to U.S. Provisional Application No. 62/072,931, filed Oct. 30, 2014, and U.S. Provisional Application No. 62/009,102, filed Jun. 6, 2014. These and all other extrinsic materials discussed herein are incorporated by reference in their entirety.

FIELD OF THE INVENTION

The field of the invention is heat transfer fluids, systems, efficiencies, and methods.

BACKGROUND

The background description includes information that may be useful in understanding the present invention. It is not an admission that any of the information provided herein is prior art or relevant to the presently claimed invention, or that any publication specifically or implicitly referenced is prior art.

Heat transfer fluids (e.g., refrigerants) are commonly used in various heat transfer systems, including air conditioning, refrigeration, freezers, heaters, and the like. Many formulations for heat transfer fluids are known.

At the time this application is filed, R22 (cholordifluoromethane) is being phased out in many developed countries due to its ozone depletion potential (ODP) and high global warming potential (GWP). There is currently a need for new compositions of heat transfer fluids that can serve as a replacement for R22 and that have improved ODP and GWP.

Various heat transfer compositions are described in WO2011/077088, AU2007338824, US20070284078, U.S. Pat. No. 6,511,610, U.S. Pat. No. 6,521,141, and RU2135541. Unfortunately, heat transfer fluids that are currently available suffer from one or more disadvantages when used as a substitute for R22.

Various R22 replacement compositions are described in Retrofit Handbook, "R-22 Retrofit Guidelines and Procedures" (2009) by NRI™. Suitable R22 replacements preferably have similar or better performance metrics (e.g., heat absorption capacity, latent heat of vaporization, amperage, pressure differential, operational temperatures, cycle time, etc.) and better ODP and GWP than R22. Replacement compositions also preferably carry mineral oil (e.g., mineral oil is miscible in the heat transfer fluid) so that the replacement fluid can be used with R22-based heat transfer systems that currently use mineral oil as a lubricant. In addition, replacement compositions preferably have low flammability levels that meet industry standards and governmental regulations.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved heat transfer fluids, systems, efficiencies and methods.

SUMMARY OF THE INVENTION

The inventive subject matter provides apparatus, systems and methods in which a heat transfer fluid composition comprises the following heat transfer components: R32 present in an amount of 15-25% by weight; R125 present in an amount of 1-5% by weight; R134a present in an amount of 50-70% by weight; and R227ea present in an amount of 10-20% by weight. These weight percentages represent the weight of a particular heat transfer component in the composition relative to the total weight of heat transfer components in the composition.

In some embodiments the heat transfer composition optionally includes R236 present in an amount of 0.5-3.5% by weight. In some embodiments, R236 could comprise one or more of R236fa and R236ea.

In another aspect of some embodiments, the heat transfer fluid composition could include, or used in combination with, a lubricant. It is further contemplated that the lubricant composition could be a mineral oil, alkylbenzene oil, and synthetic oil, or any combination thereof.

The heat transfer components and their respective amounts are preferably selected such that the heat transfer compositions have a flammability classification of A1 as defined by ISO817:2009, a Global Warming Potential (GWP) of less than 2000 at an Integration Time Horizon (ITH) of 100 years.

The heat transfer compositions described herein can be used in heat transfer systems comprising: a compressor; a condenser fluidly coupled with the compressor; an expansion device (e.g., fixed orifice, capillary tubes and various expansion valve types) fluidly coupled with the condenser; and an evaporator fluidly coupled with the expansion device. Examples of heat transfer systems include, but are not limited to, air conditioning, refrigeration, freezers, and heaters. The heat transfer system is designed to transfer heat with an external environment by utilizing the gas-to-liquid and liquid-to-gas phase change properties of the heat transfer composition.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
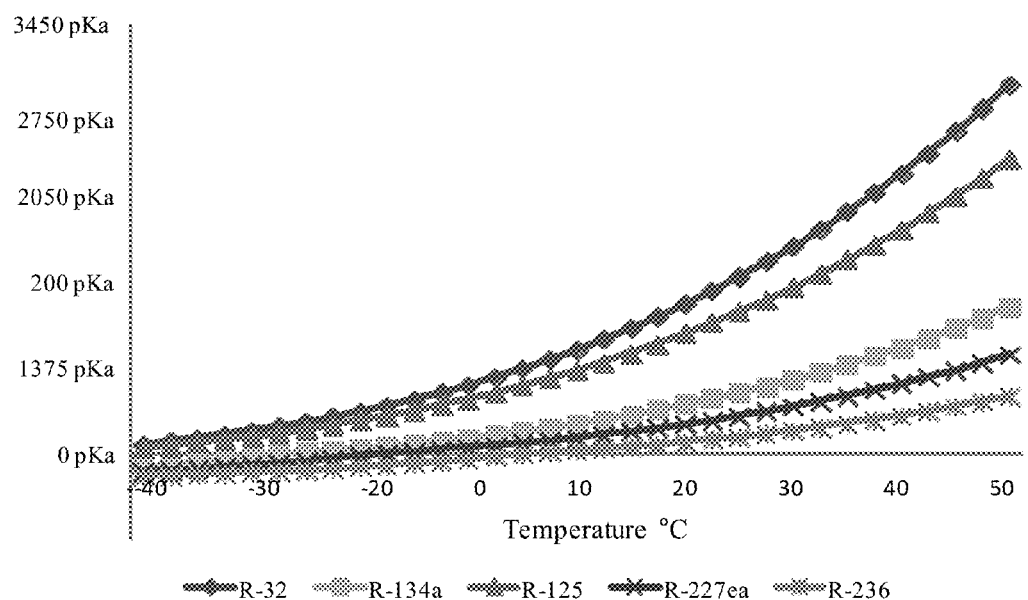
FIG. 1 illustrates the staggered boiling points of five different heat transfer fluid components at varying temperatures and pressures.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It is contemplated that an ideal R22 replacement minimizes environmental impact characteristics (e.g., GWP and ODP) and hazard potential (e.g., flammability, toxicity), while maximizing efficiency (e.g., reduced equipment amperage) and compatibility with existing refrigerant systems (e.g., compatibility with mineral oil as a lubricant). Thus, one aspect of the inventive subject matter includes a novel R22 replacement that maximizes efficiency and compatibility with existing systems, while minimizing environmental impact and flammability.

Most R22 replacement components have competing disadvantages and advantages, which means that most R22 replacement compositions are less than ideal. The inventors have unexpectedly discovered that the heat transfer compositions disclosed herein have a measured operating performance and energy efficiency that are comparable to, or better than, the performance of R22 and R22 replacements. Thus, in some embodiments, the disclosed compositions have been developed to (i) deliver operating performance that is comparable with R22 and (ii) reduce energy consumption compared to R22 through reduced equipment amperage and reduced run-times. As a result of increased energy efficiency, the mechanical and operational load of the heat transfer system is reduced in measurable amounts, where the result can be characterized through reduced energy consumption.

Many R22 replacements are blends of individual components. Table 1 below shows a number of characteristics of common components in R22 replacement blends.

TABLE 1

Environmental Impact of Common Components of R22 Replacement Blends

| Heat Transfer Component | Boiling Point (° C.) | Boiling Point (° F.) | GWP | ITH | ODP | Safety Flammability |
|---|---|---|---|---|---|---|
| R22 | −40.7 | −41.3 | 1810 | 100 | 0.055 | A1 |
| R32 | −51.7 | −61.1 | 675 | 100 | 0.00 | A2 |
| R125 | −48.5 | −55.3 | 3500 | 100 | 0.00 | A1 |
| R134a | −26.3 | −15.3 | 1430 | 100 | 0.00 | A1 |
| R227ea | −16.4 | 2.5 | 3220 | 100 | 0.00 | A1 |
| R236ea | −1.0 | 30.2 | 1370 | 100 | 0.00 | A1 |
| R236fa | −1.4 | 29.5 | 9810 | 100 | 0.00 | A1 |
| R152a | −25.0 | −13.0 | 124 | 100 | 0.00 | A2 |
| R600a | −11.7 | 10.9 | 3 | 100 | 0.00 | A3 |
| R601a | 27.8 | 82.0 | 0.1 | 100 | 0.00 | A3 |
| R143a | −47.6 | −53.7 | 4470 | 100 | 0.00 | A2L |

As can be seen in Table 1 above, many R22 replacement components have an ODP of zero, or substantially zero. However, depending on the component, the boiling point, GWP, and flammability values vary. Each of these characteristics may make a component desirable or undesirable as a refrigerant or component in a refrigerant blend. A discussion of R22 replacement blends is discussed in "Refrigerant blends; a review of alternate refrigerants and near-azeotropic refrigerant mixtures," by John A Tomczyk, Engineering Systems May 1993, page 15.

There has been much effort to find optimal blends of refrigerants with no ODP and low GWP. Table 2, for example, shows the components of a number of common R22 replacement compositions compared with the composition of a few proposed embodiments of the inventive subject matter.

TABLE 2

Components of Conventional R22 Replacements

| Composition | Trade Name | R32 | R125 | R134a | R227ea | R236fa | R152 | R600a | R601a | R143a | R22 |
|---|---|---|---|---|---|---|---|---|---|---|---|
| R22 | R22 | — | — | — | — | — | — | — | — | — | 100.0% |
| 422B | NU22 | — | 55.0% | 42.0% | — | — | — | 3.0% | — | — | — |
| 422C | One Shot | — | 82.0% | 15.0% | — | — | — | 3.0% | — | — | — |
| 422A | MO79 | — | 85.1% | 11.5% | — | — | 3.4% | — | — | — | — |
| 422D | MO29 | — | 65.1% | 31.5% | — | — | — | 3.4% | — | — | — |
| 438A | MO99 | 8.5% | 45.0% | 44.2% | — | — | — | 1.7% | 0.6% | — | — |
| 424A | RS-44 | — | 50.5% | 47.0% | — | — | — | 1.9% | 0.6% | — | — |
| 434A | RS-45 | — | 63.2% | 16.0% | — | — | — | 2.8% | — | 18.0% | — |
| 404A | Suva 404A | — | 44.0% | 4.0% | — | — | — | — | — | 52.0% | — |
| 407C | Suva 407C | 23.0% | 25.0% | 52.0% | — | — | — | — | — | — | — |
| 407F | LT | 30.0% | 30.0% | 40.0% | — | — | — | — | — | — | — |
| 442A | RS-50 | 31.0% | 31.0% | 30.0% | 5.0% | — | 3.0% | — | — | — | — |
| 410A | 410A | 50.0% | 50.0% | — | — | — | — | — | — | — | — |
| 425A | 425A | 18.5% | — | 69.5% | 12.0% | — | — | — | — | — | — |
| Composition 1 | — | — | 23% | 3% | 55% | 19% | — | — | — | — | — |
| Composition 2 | — | — | 21% | 4% | 63% | 13% | 1% | — | — | — | — |
| Composition 3 | — | — | 21% | 4% | 61% | 14% | 1% | — | — | — | — |
| Composition 4 | — | — | 10% | 10% | 78% | — | — | 2% | — | — | — |
| Composition 5 | — | — | 21% | 4% | 61% | 12% | 3% | — | — | — | — |
| Composition 6 | — | — | 21% | 4% | 60% | 15% | — | — | — | — | — |
| Composition 7 | — | — | 22% | 5% | 59% | 10% | 4% | — | — | — | — |

Note:
Compositions 1 through 7 are rounded to the nearest whole number.

One common trend in R22 placement compositions is to utilize components with a low GWP, which can result in an overall lower GWP for the resulting blend. For example, in many applications, R32 is a popular R22 replacement because it has desirable environmental performance (GWP of 675 and an ODP of 0.00). Additionally, R32 has similar performance metrics as R22. One disadvantage of R32 is its flammability (ASHRAE Safety Group A2). Additionally, R32 is not miscible with mineral oil. For more details on R32 as an R22 replacement component, see "World's First Adoption of R32, a Refrigerant With Low Global Warming Potential," Daikin Group CSR Report (2013).

Additionally, many known R22 replacement compositions contain the component R134a. R134a is a desirable component because it has an ODP of zero. However, many blends only contain R134a in moderate amounts (often <50%) because R134a has a moderate GWP potential (1430). One additional disadvantage to R134a is that it is not miscible with mineral oil.

Another common component in many R22 replacement compositions is R125. Many R22 replacement compositions use R125 in large amounts (often >25%) because of R125's fire suppression properties. However, R125 has a very high GWP (3500) and is not miscible with mineral oil.

Table 3 shows properties of several R22 replacement blends compared with the properties of several blends of the inventive subject matter.

TABLE 3

Environmental Characteristics of Blends

| Composition | Trade Name | Liquid Phase @ 37.8° C. (kPa) | Latent Heat of Vaporization (kJ/kg) * | GWP | Flammability Classification |
|---|---|---|---|---|---|
| R22 | R22 | 1352 | 234 | 1810 | A1 |
| 422B | NU22 | 1367 | 192 | 2526 | A1 |
| 422C | One Shot | 1627 | 177 | 3085 | A1 |
| 422A | MO79 | 1662 | 175 | 3143 | A1 |
| 422D | MO29 | 1464 | 187 | 2729 | A1 |
| 438A | MO99 | 1453 | 211 | 2265 | A1 |
| 424A | RS-44 | 1302 | 194 | 2440 | A1 |
| 434A | RS-45 | 1568 | 189 | 3245 | A1 |
| 404A | Suva 404A | 1633 | 201 | 3921 | A1 |
| 407C | Suva 407C | 1556 | 244 | 1774 | A1 |
| 407F | LT | 1720 | 253 | 1825 | A1 |
| 442A | RS-50 | 1738 | 253 | 1888 | A1 |
| 410A | 410A | 2198 | 273 | 2088 | A1 |
| 425A | 425A | 1259 | 238 | 1505 | A1 |
| Composition 1 | | 1376 | 239 | 1659 | A1 |
| Composition 2 | | 1332 | 240 | 1624 | A1 |
| Composition 3 | | 1333 | 239 | 1650 | A1 |
| Composition 4 | | 1206 | 232 | 1533 | A1 |
| Composition 5 | | 1325 | 239 | 1824 | A1 |
| Composition 6 | | 1345 | 239 | 1623 | A1 |
| Composition 7 | | 1358 | 242 | 1882 | A1 |

* Heat of Vaporization determined using NIST REFPROP software ver. 9.1.
Note:
Flammability test have not been performed for Compositions 1, 2, 4, 6 and 7.

As can be seen in Table 3, the inventive compositions have a flammability rating of A1 and a GWP below 2000 (GWP values were calculated as a straight linear average of the components of each blend). Additionally, the inventive compositions have a liquid phase pressure under 1400 kPa and a latent heat of vaporization ranging from 232-242 kJ/kg.

The inventors have discovered that certain blends of components in novel quantities greatly outperform similar R22 replacement compositions. In one aspect of the inventive subject matter, the inventors have discovered a combination of specific heat transfer components with sequenced or spaced 'boiling points' which produces a superior heat transfer capability. The improvement over existing R22 replacements is greater than would otherwise be expected based on the individual and collective chemical heat absorption attributes of each constituent.

One previously unappreciated reason for this improvement is that staggered boiling points create a 'domino' effect as each individual constituent reaches its boiling point. This 'domino' effect maximizes each component's heat absorption until the heat absorption begins to be saturated. When the heat absorption capacity of an individual component starts to saturate, the next sequential constituent reaches its boiling point, which maximizes each component's heat absorption until it starts to saturate. This is true for each heat transfer component, which creates a more consistent phase change during the liquid-to-gas and gas-to-liquid phase changes across the evaporator and condenser coils of the equipment. This effect is best illustrated with at least four heat transfer components, and is further illustrated with five or more heat transfer components that have sequenced boiling points.

The inventive subject matter provides heat transfer compositions that have at least four heat transfer components that have been purposely selected to provide staggered boiling points and related P/T charts. Five possible heat transfer components and their respective boiling points are provided below (see also Table 1):

1. R32: boils at −51.7 C (−61.0 F)
2. R125: boils at −48.5 C (−55.3 F)
3. R134a: boils at −26.3 C (−15.3 F)
4. R227ea: boils at −16.4 C (+2.5 F)
5. R236fa: boils at −1.4 C (+29.5 F)

The pressure/temperature graph in FIG. 1 illustrates the sequenced (e.g., "stacked" or "staggered") nature of these five heat transfer components. While R32, R125, R134a, R227ea, and R236fa are shown in FIG. 1, the inventive subject matter includes alternative heat transfer components that have similar characteristics (e.g., flammability, boiling temperature/pressure, GWP, ODP, etc.) to provide a heat transfer composition with comparable performance to R22 and reduced energy consumption compared to R22. For example, the heat transfer composition could included R32 present in an amount of 15-25% by weight, R125 present in an amount of 1-5% by weight, and three additional components that have boiling temperatures within the ranges of −55° C. (−67° F.) and −35° C. (−31° F.), −40° C. (−40° F.) and −20° C. (68° F.), and −25° C. (−13° F.) and −5° C. (23° F.), respectively, at 101.3 kPA (14.696 PSIA). The three additional components are preferably selected such that the heat transfer composition has (i) a latent heat of vaporization of at least 230 kJ/kg, and more preferably at least 232 kJ/kg, and (ii) a liquid phase pressure at 37.78° C. (100° F.) of less than 1400 kPa (203 PSIG). Those of ordinary skill in the art will also appreciate that new heat transfer components developed after the filing of this application may also be used consistently with the inventive principles described herein to provide a heat transfer composition that accomplishes the stated objectives (e.g., staggered boiling temperatures, improved latent heat of vaporization, lower liquid/vapor phase pressure, acceptable flammability, etc.).

It should also be appreciated that the additional heat transfer components could be selected based on their partial pressures at a given temperature rather than, or in addition to, their boiling temperatures. For example, the first additional component could have a partial pressure between 503.3 kPa (73 PSIG) and 641.2 kPa (93 PSIG) at 0° C. (32° F.), 737.7 kPa (107 PSIG) and 875.6 kPa (127 PSIG) at 10° C. (50° F.), and/or 1606 kPa (233 PSIG) and 1744 kPa (253 PSIG) at 35° C. (95° F.). The second additional component could have a partial pressure between 124.1 kPa (18 PSIG) and 262 kPa (38 PSIG) at 0° C. (32° F.), 241.3 kPa (35 PSIG) and 379.2 kPa (55 PSIG) at 10° C. (50° F.), and/or 717.1 kPa (104 PSIG) and 854.9 kPa (124 PSIG) at 35° C. (95° F.). The third component could have a partial pressure between 27.58 kPa (4 PSIG) and 165.5 kPa (24 PSIG) at 0° C. (32° F.), 110.3 kPa (16 PSIG) and 248.2 kPa (36 PSIG) at 10° C. (50° F.), and/or 441.3 kPa (64 PSIG) and 579.2 kPa (84 PSIG) at 35° C. (95° F.).

The proposed combinations of components are unexpected for many reasons. For example, although R32 is a highly effective refrigerant, it has a flammable rating and high operating pressure that increases electricity consumption. As a result, many R22 replacements do not utilize R32 (see Table 2 and Table 3 above).

However, the disclosed compositions use multiple flame-retarding or flame-inhibiting constituents with varying boiling points and operating pressures to offset both the flammability and high operating pressure of R32. The sequence spaced boiling points of the multiple constituents effectively offset the flammability and high operating pressure of R32 to provide a non-flammable, low pressure, energy efficient and highly effective heat transfer composition.

The disclosed composition is unexpected because, although many R22 replacement compositions contain R134a, they do not do so in quantities greater than 50%. R134a is a good refrigerant, but many blends only use R134a in moderate amounts (often <50%) because R134a has a moderate GWP potential (1430) and is not miscible with mineral oil.

Conventional approaches to refrigerant design teach against using R236fa and R227ea because they have a high GWP. However, when stacked with other components in the manner disclosed herein, their undesirable characteristics of R236fa can be minimized. In addition, R227ea is useful in providing miscibility in mineral oil. In order to make a blend that is miscible, many R22 replacements contain R600a and R601a. However, unlike R227ea, R600a and R601a are very flammable (see Table 1, Table 2b, and Table 3). In sum, the inventors have discovered a unique combination of R22 replacement components that, when blended together, not only optimize flammability, GWP, and ODP, but also provide unexpected improvements in performance and efficiency compared to known refrigerant blends made of similar components.

Unexpected Performance of Inventive Subject Matter

The inventive subject matter includes novel combinations of R22 replacement components that perform better than expected given conventional understanding of R22 replacements. Two important metrics for increasing the effectiveness of an R22 measurement include the latent heat of vaporization (measured in kJ/kg) and the liquid phase pressure (measured in kPa). Good R22 replacements maximize the latent heat of vaporization while minimizing the liquid phase pressure, while also minimizing GWP and flammability. Measurements for each of these values for common R22 replacements and certain embodiments of the inventive subject matter are shown above in Table 3.

The inventors have discovered certain blends that perform unexpectedly better than common R22 replacements in terms of amp savings and energy consumption despite having similar constituents (in some cases), and similar values for latent heat of vaporization and liquid phase pressure.

Table 4 below shows a 24 hour performance comparison between R22 and Composition 5 under similar conditions. The test occurred on different days with nearly identical temperatures so that the same testing equipment could be used.

TABLE 4

24 hour Performance Comparison of Averages Between R22 and Composition 5

| Product | Start Time | End Time | 24 hr. Outside Air Temp (° C.) | Discharge Line Pressure (kPa) | Suction Line Pressure (kPa) | OSA Temp (° C.) | Liquid Line Temp (° C.) | Real Power Sum (kW) | Suction Line Temp (° C.) |
|---|---|---|---|---|---|---|---|---|---|
| R22 | 0:00:00 | 23:59:00 | 18.8 | 1538.0 | 427.5 | 24.7 | 37.3 | 59.4 | 13.5 |
| Composition 5 | 0:00:00 | 23:59:00 | 18.6 | 1476.3 | 341.4 | 25.3 | 37.3 | 50.1 | 6.2 |
| | # Variance | | −0.1 | −61.7 | −86.0 | 0.6 | 0.0 | −9.3 | −7.3 |
| | % Variance | | −1% | −4% | −20% | 2% | 0% | −16% | −54% |

| Product | Start Time | End Time | Phase A Current (Amps) | Phase B Current (Amps) | Phase C Current (Amps) | Return Air Temp (° C.) | Supply Air Temp (° C.) | Δ T (° C.) | Total Energy (kWh) |
|---|---|---|---|---|---|---|---|---|---|
| R22 | 0:00:00 | 23:59:00 | 84.0 | 89.5 | 85.4 | 19.5 | 8.1 | 11.4 | 872.3 |
| Composition 5 | 0:00:00 | 23:59:00 | 71.8 | 79.6 | 73.0 | 19.3 | 8.2 | 11.1 | 695.0 |
| | # Variance | | −12.2 | −9.9 | −12.3 | −0.1 | 0.2 | −0.3 | −177.3 |
| | % Variance | | −15% | −11% | −14% | −1% | 2% | −2% | −20% |

Note:
Data gathered from a 1,200,000 Btu/hr rooftop HVAC system.

The data in Table 4 shows that in terms of Amps and Total Energy (kWh) over a 24 hour period, Composition 5 greatly outperforms R22. In an addition, the inventors also observed a reduced physical temperature (e.g., compressor operates at a lower temperature) of the compressor of the heat transfer system used in testing.

Table 5 below shows another performance comparison between R22 and Composition 5.

TABLE 5

Performance Comparison of Averages* Between R22 and Composition 5

| Product | | Return Air Temp (C.) | Supply Air Temp (C.) | Delta T (C.) | Comp. (Amps) | Suction Line Pressure (kPa) | Discharge Line Pressure (kPa) | Comp. Head Temp (C.) |
|---|---|---|---|---|---|---|---|---|
| R22 | Average => | 23.7 | 15.6 | 8.08 | 12.2 | 526.2 | 1888.8 | 72.7 |
| Composition 5 | Average => | 21.7 | 13.5 | 8.15 | 9.6 | 393.9 | 1586.4 | 62.5 |
| | # Variance | −2.0 | −2.1 | 0.1 | −2.5 | −132.3 | −302.5 | −10.2 |
| | % Variance | −9% | −13% | 1% | −21% | −25% | −16% | −14% |

*Averages based on unit running with outside air temperature between 32.2-35.0° C.
Note:
Data based on a 192,000 Btu/hr unit.

Again, the data shows composition 5 outperforming R22 under similar conditions.

Additional testing of compositions 3 and 5 was completed at PG&E's San Ramon Technology Center. Table 6 below shows the results.

TABLE 6

Performance Comparison Between R22 and Composition 3 and Composition 5

| | # of Compressors | OA Temp (C.) | RA Temp (C.) | SA Temp (C.) | Suction Line Pressure (kPa) | Disch Line Pressure (kPa) | Comp Head Temp (C.) | Mass Flow (kg/min) | Amps | EER Btu/Wh | COP | kW/Ton | Sens Btu/Wh |
|---|---|---|---|---|---|---|---|---|---|---|---|---|---|
| R22 | 1 | 18.3 | 26.7 | 20.8 | 468.8 | 1472.9 | 34.0 | 5.3 | 6.0 | 8.5 | 2.4 | 1.4 | 5.6 |
| R22 | 1 | 20.0 | 26.7 | 20.9 | 475.5 | 1532.6 | 34.2 | 5.3 | 6.1 | 8.3 | 2.4 | 1.4 | 5.5 |
| R22 | 1 | 21.7 | 26.7 | 20.9 | 481.2 | 1593.8 | 34.5 | 5.3 | 6.1 | 8.1 | 2.3 | 1.5 | 5.3 |
| R22 | 1 | 27.5 | 26.7 | 21.2 | 501.1 | 1815.6 | 35.3 | 5.3 | 6.4 | 7.2 | 2.1 | 1.7 | 4.8 |
| R22 | 2 | 18.3 | 26.7 | 14.8 | 472.4 | 1481.5 | 34.4 | | 5.9 | 10.7 | 3.0 | 1.1 | 7.0 |
| R22 | 2 | 23.9 | 26.7 | 15.1 | 491.5 | 1679.8 | 35.2 | | 6.1 | 9.6 | 2.7 | 1.2 | 6.4 |
| R22 | 2 | 29.4 | 26.7 | 15.5 | 512.0 | 1901.0 | 36.3 | | 6.4 | 8.6 | 2.4 | 1.4 | 5.8 |
| R22 | 2 | 35.0 | 26.7 | 15.9 | 531.0 | 2139.1 | 37.2 | | 6.7 | 7.7 | 2.2 | 1.6 | 5.3 |
| R22 | 2 | 40.7 | 26.7 | 16.4 | 548.0 | 2399.5 | 37.9 | | 6.9 | 6.8 | 1.9 | 1.8 | 4.8 |
| R22 | 2 | 46.1 | 26.7 | 16.9 | 565.6 | 2689.4 | 38.1 | | 7.2 | 5.8 | 1.7 | 2.1 | 4.3 |
| Composition 3 | 1 | 18.3 | 26.7 | 21.0 | 361.9 | 1323.9 | 29.2 | 5.4 | 5.5 | 9.1 | 2.7 | 1.3 | 5.8 |
| Composition 3 | 1 | 20.0 | 26.7 | 21.1 | 366.9 | 1382.2 | 29.2 | 5.3 | 5.5 | 8.6 | 2.5 | 1.4 | 5.6 |
| Composition 3 | 1 | 21.7 | 26.7 | 21.2 | 372.6 | 1442.2 | 29.4 | 5.3 | 5.5 | 8.4 | 2.5 | 1.4 | 5.4 |
| Composition 3 | 1 | 27.5 | 26.7 | 21.4 | 387.5 | 1648.4 | 29.3 | 5.1 | 5.7 | 7.3 | 2.2 | 1.6 | 5.1 |
| Composition 3 | 2 | 18.3 | 26.7 | 16.1 | 367.7 | 1344.7 | 30.6 | | 5.5 | 11.4 | 3.3 | 1.1 | 6.7 |
| Composition 3 | 2 | 23.9 | 26.7 | 15.7 | 383.4 | 1511.4 | 30.9 | | 5.7 | 9.8 | 2.9 | 1.2 | 6.8 |
| Composition 3 | 2 | 29.4 | 26.7 | 16.1 | 406.8 | 1723.8 | 32.8 | | 6.0 | 8.9 | 2.6 | 1.3 | 6.2 |
| Composition 3 | 2 | 35.0 | 26.7 | 16.6 | 421.3 | 1934.0 | 33.4 | | 6.2 | 8.1 | 2.4 | 1.5 | 5.7 |
| Composition 3 | 2 | 40.7 | 26.7 | 17.1 | 435.8 | 2169.9 | 34.0 | | 6.3 | 7.1 | 2.1 | 1.7 | 5.2 |
| Composition 3 | 2 | 46.3 | 26.7 | 17.8 | 449.8 | 2421.0 | 34.8 | | 6.5 | 6.0 | 1.8 | 2.0 | 4.7 |
| Composition 5 | 1 | 18.3 | 26.7 | 21.0 | 374.4 | 1349.4 | 26.7 | 5.7 | 5.6 | 9.5 | 2.8 | 1.3 | 5.8 |
| Composition 5 | 1 | 20.0 | 26.7 | 21.0 | 383.4 | 1405.9 | 27.7 | 5.7 | 5.7 | 9.3 | 2.7 | 1.3 | 5.8 |
| Composition 5 | 1 | 21.4 | 26.7 | 21.4 | 403.4 | 146.2 | 27.1 | 5.6 | 5.9 | 7.9 | 2.3 | 1.5 | 5.1 |
| Composition 5 | 2 | 18.3 | 26.7 | 15.3 | 373.7 | 1345.9 | 26.6 | | 5.6 | 10.7 | 3.1 | 1.1 | 7.4 |
| Composition 5 | 2 | 23.9 | 26.7 | 15.6 | 400.6 | 1553.4 | 28.4 | | 5.8 | 9.9 | 2.9 | 1.2 | 6.8 |
| Composition 5 | 2 | 29.4 | 26.7 | 16.1 | 417.1 | 1752.0 | 28.7 | | 6.0 | 8.9 | 2.6 | 1.3 | 6.3 |
| Composition 5 | 2 | 35.0 | 26.7 | 16.5 | 432.3 | 1952.7 | 29.6 | | 6.1 | 8.1 | 2.4 | 1.5 | 5.8 |
| Composition 5 | 2 | 40.6 | 26.7 | 17.1 | 445.4 | 2183.6 | 29.4 | | 6.2 | 7.1 | 2.1 | 1.7 | 5.3 |
| Composition 5 | 2 | 46.1 | 26.7 | 17.7 | 458.5 | 2428.4 | 30.1 | | 6.4 | 6.1 | 1.8 | 2.0 | 4.7 |

Lab controlled conditions - Carrier Single-Package Rooftop Unit - 102,000 Btu/hr, 2 Circuits, 2 Compressors.
Testing performed in the HVAC testing apparatus in the Advanced Technology Performance Lab (ATPL) at PG&E's San Ramon Technology Center The results of the controlled laboratory tests, as depicted in Table 6, show a consistent improvement in efficiency performance when compared to R22. The unit was able to operate with less electricity, at lower operating pressures and with lower compressor head temperatures while delivering greater cooling capacity per watthour consumed. This is unexpected, as R22, on paper and in simulations, should deliver more cooling capacity per watthour consumed. However, in the controlled tests performed by PG&E, both composition 3 and composition 5 consistently outperformed R22 in highly controlled conditions. The lower operating pressures and lower compressor head temperatures should not be overlooked, as this again goes against conventional thinking. Typically one would see lower operating pressures and lower compressor head temperatures with less efficient refrigerants delivering less cooling capacity per watt hour consumed.

The results above are particularly unexpected, especially when the constituents of the novel compositions are compared with the constituents and performance of R425A. R425A has a similar latent heat of vaporization (238 kJ/kg), and pressure (1259 kPa), and achieves a flammability rating of A1. R425a comprises 69.5% R134a, 18.5% R32 and 12% R227ea. By these measurements one skilled in the art would expect that it would outperform the contemplated compositions of the inventive subject matter, which have similar latent heat of vaporization values (232–242 kJ/kg) and slightly higher pressure values. However R425a does not perform nearly as well due to its lack of properly staggered constituents and its lack of a highly polar constituent as previously described. Empirical testing data shows Composition 5 outperforms R425A by 50% when comparing its cooling capacity (over an industry expectation target) and was also superior when comparing cooling speed/cycle time. R425A was shown to use the same amount of electricity (amps) as Composition 5 although Composition 5 produced more capacity and reaches optimal cooling much more rapidly and therefore ran less often due to reduced cycle time to produce substantial energy savings. Performance Note: "The outside air temperatures for both the testing of both products (Composition 5 and R425A) averaged 88 degrees and the same 5.3 compressor amps during running conditions. Composition 5 brought the evaporator coil to an average 39.1 F while the R425 average was 2.2 degrees warmer (5.6%) at 41.3 F. The overall cooling performance comparison was based on the variance to the targeted Temperature Split (Room Return Air Dry Bulb minus Supply Air Dry Bulb Temperature adjusted for the impact of varying indoor conditions (Return Air Wet Bulb)). The variance to target for Composition 5 was 24.2%. The variance to target for R425A was 12.1%. Composition 5 significantly surpassed the R425A with a 50% improvement in performance compared to R425A.

The inventors theorize that the reason for this is that the novel compositions have staggered constituents that both increase cooling over the full length of the condenser coils and reduce cycle time by increasing cooling speed.

The conclusions derived from these tests provide definable validation of the inventive subject matter as to the creation of unexpected and not seen before patterns of system operating performance based on comparable R22 capacities being attained through lower operating pressures and temperatures while providing shorter operating cycles and lower amperages.

During the testing periods it was noted that many of the experimental compositions would work towards meeting the performance criteria established for the inventive subject matter but would not meet the evaluative requirements for flammability as established by governing bodies. The inclusion of a hydrocarbon increased the potential of non-compliance in accordance with EPA acceptability guidelines for flammability. These experimental compositions remain viable for many applications where R22 is used, such as refrigeration, chillers and residential systems, and in which flammability is less of a concern. For the purposes of maximizing the discovered low pressure/low temperature performance of the current inventive subject matter, one of many applications can be in the heating and cooling requirement of small, medium and large sized HVAC systems.

During testing, the inventors also unexpectedly discovered that the compositions disclosed above began to absorb heat in less time upon system startup and reached optimal performance faster as compared to R22. This attribute known as 'ramp time' resulted in a reduction in the equipment 'on-time or run-time' as compared to the R22 based equipment which reduces energy consumption.

Figure 2A:
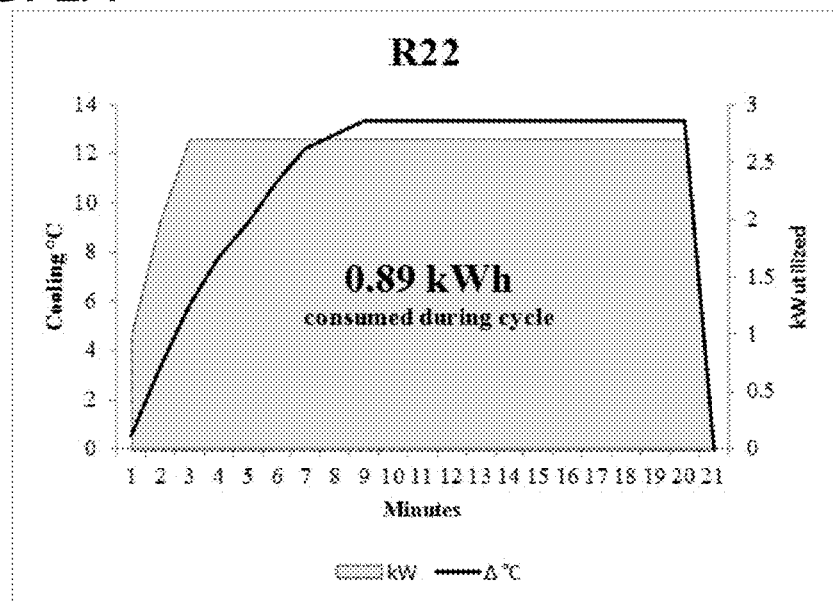
FIG. 2A illustrates the ramp-up cycle time of R22.
Figure 2B:
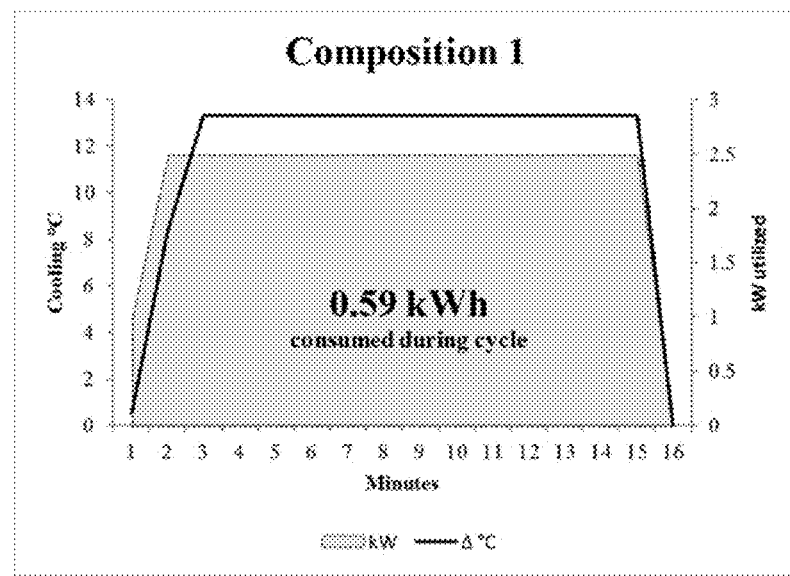
FIG. 2B illustrates the ramp-up cycle time one composition of the inventive subject matter.

The data presented in FIGS. 2A and 2B are a representation of 'ramp time' observation for the inventive subject manner as it is cycles from off to in system operation. The slope of the ramp time curve represents the disclosed composition's ability to absorb heat faster and obtain optimum operating performance quicker as a result of the sequence spaced boiling point capabilities. This decreased time to obtain optimum operating performance results in a shorter cycle time and reduced of kilowatt hours of 15-30%. The comparison in FIGS. 2A and 2B was performed on a Carrier 120,000 Btu/hr Packaged Rooftop Heat Pump Unit with two compressors.

The disclosed compositions have demonstrated in testing the characteristic and capability of reducing the temperature of the air flow being provided to the space being serviced (Supply Air) as the evaporator performs at a higher degree of cooling. Testing has demonstrated that the temperature range of the evaporating function is typically equivalent to heat transfer systems using R22 Replacement heat transfer fluids. The test data in FIGS. 2A and 2B, in addition to the results in Table 4 for Composition 5 further illustrate this finding.

Figure 3:
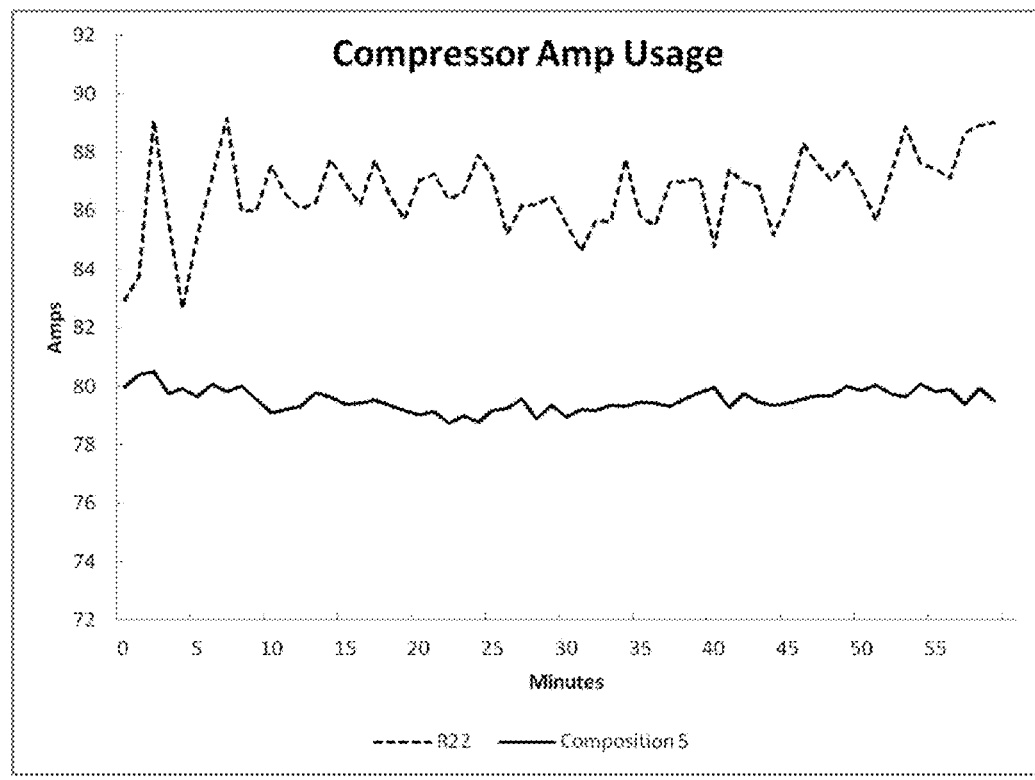
FIG. 3 compares the performance of R22 with one composition of the inventive subject matter in terms of compressor amp usage over a one-hour period.

FIG. 3 is a graph of a one hour period (9:00 AM-9:59 AM on both testing days) comparing the amp usage of R22 and Composition 5. As can be seen in FIG. 3, Composition 5 uses less amps overall. Additionally, the amp usage of Composition 5 is more stable than R22. The amp usage of R22 has a greater variance when compared with Composition 5.

In an additional example, as shown by the test data in Table 3 above, composition 6 and composition 7 have a high level of heat absorption at a significantly lower liquid and vapor pressure compared to the R22 replacement compositions. This combination of high heat absorption and lower pressure reduces the energy requirements of the HVAC equipment, creating a reduction in energy consumption. The test data also shows the comparison between a composition with and without the addition of R236. The addition of R236 in even a small weight percentage to volume of product shows a substantial increase in latent heat of vaporization, while achieving measurable lower pressure.

Another key feature of the compositions disclosed herein is their ability to carry mineral oil. In particular, some of the heat transfer components in the composition are selected specifically selected for their 'oil carrying' characteristics. It is known that there are conflicts between some compressor oils (e.g., mineral, POE, PAG) and today's refrigerants that requires the replacement of the compressor oils or by adding a highly flammable hydrocarbon to the refrigerant. The attributes of the compositions disclosed herein specifically address this compressor oil issue by utilizing the specific oil carrying characteristics of selected constituents to achieve lubrication in the HVAC system without the need to replace the compressor oil or the need to add flammable hydrocarbons to the refrigerant, allowing for continued system operation without any requirement of oil replacement or augmentation.

In one aspect of some embodiments, the inventive subject matter includes a heat transfer composition that adequately carries mineral oil in R22 based equipment to obtain lubrication without using a hydrocarbon component in the heat transfer composition. The disclosed compositions include R227ea and R236 in sufficient amounts to adequately carry mineral oil to achieve lubrication in the R22 based equipment while still maintaining a flammability classification of A1. In some embodiments the composition includes up to 15-25% by wt of R32; 10-20% by wt of R227ea, and 0.5-3.5% by wt. of R236. The composition may additionally include 50-70% by wt of R134a, and 1-5% by wt of R125.

One of the key findings of the inventive subject matter has been to recognize that R236 has one of the strongest dipole moment of all HFC based refrigerants. (i.e., bond polarity is measured by its dipole moment). The strong dipole moment gives R236 the ability to induce hydrogen bonding with proton acceptor compounds.

The inventors theorize that that the hydrogen bonding attributes of R236 could be bonding with the remainder of the composition, thus extending the phase change of the other constituents and thereby elongating the heat absorption phase and increasing the efficiency of the equipment.

Additionally, because of the high boiling point of R236, tiny droplets likely remain in a liquid phase suspended in the vapor of the other constituents, which could act as a catalyst helping to compress the vapor back into a liquid reducing the work of the compressor.

It is believed that these micro droplets and/or nano droplets utilize chemical, polar energy to help induce the gas to liquid phase change thus lowering the kinetic energy and electricity consumption required by the compressor. As such, the inventive subject matter includes compositions that have five or more heat transfer components with sequenced boiling temperatures, wherein the fifth (or last) component has a high polarity, wherein the polarity of the molecule is the sum of all of the bond polarities in the molecule. In some embodiments, the polarity of the fifth (or last) constituent is preferably near, or even higher than, the polarity of R236-6.7±0.5 10-24 cm$^3$. In yet other embodiments, the fifth (or last) component could not only have the highest boiling temperature of all the heat transfer components in the composition, but could also have the highest polarity of all the heat transfer components in the composition.

The features, functions and capabilities of the compositions disclosed herein may be further enhanced by the incorporation of a lubricant, which can be added in pre/post production processes to further enhance the capacity, energy savings and temperature reductions typically experienced when using the disclosed compositions. Contemplated lubricants include mineral oil, alkylbenzene oil, and synthetic oil, or any combination thereof. Popular synthetics include polyalkylene glycol (PAG), esters (diester and polyolester) and polyalphaolefin (PAO).

One should appreciate that the disclosed techniques provide many advantageous technical effects including heat transfer fluids for heat transfer systems that provide improved performance metrics.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A heat transfer composition comprising heat transfer components present in the following percentages:
R32 present in an amount of 15-25% by weight;
R125 present in an amount of 1-5% by weight;
R134a present in an amount of 50-70% by weight;
R227ea present in an amount of 10-20% by weight; and
R236 present in an amount of 0.5-3.5% by weight.

2. The heat transfer composition of claim 1, wherein the R32, R125, R134a and R227ea collectively comprise at least 96.5% of the heat transfer composition.

3. The heat transfer composition of claim 1, further comprising a lubricant composition.

4. The heat transfer composition of claim 3, wherein the lubricant is a combination of one or more of a mineral oil, alkylbenzene oil, and synthetic oil.

5. The heat transfer composition of claim 1, wherein the amounts are selected such that the composition has a flammability classification of A1 as defined by ISO817:2009.

6. The heat transfer composition of claim 1, wherein the amounts are selected such that the composition has a Global Warming Potential (GWP) of less than 2000 at Integration Time Horizon (ITH) of 100 years.

* * * * *